July 16, 1940.  M. B. STRAUSE  2,207,903
DRY GRATER
Filed Feb. 10, 1939
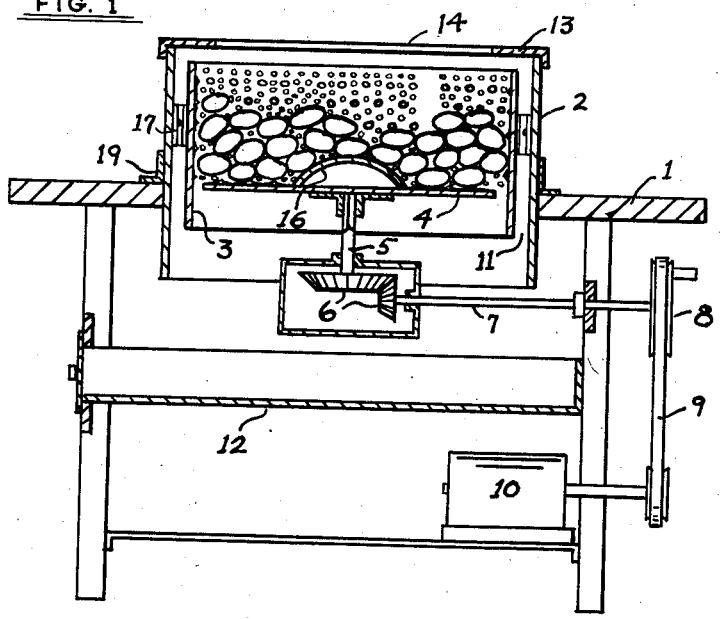
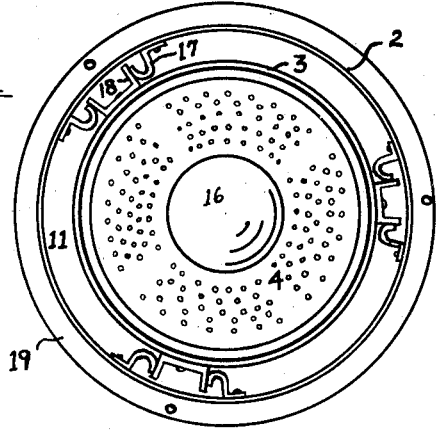
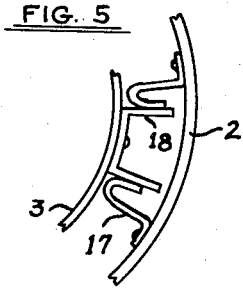
INVENTOR.
Monroe Boston Strause
BY R. P. Clarkson
ATTORNEY

UNITED STATES PATENT OFFICE 2,207,903

DRY GRATER

Monroe Boston Strause, Long Island City, N. Y., assignor of one-third to Milburn Moore, Brooklyn, N. Y.

Application February 10, 1939, Serial No. 255,589

2 Claims. (Cl. 146—177)

My invention relates to dry graters, particularly for fruit and vegetables.

An object of my invention is to provide a simple, sanitary, economical and satisfactory device, preferably power driven, for use as a dry greater for citrus fruit such as lemons, for instance, which permits the grated skin or rind to be saved and used, and also suitable for dry abrading of vegetables such as potatoes, for example, in which case the skin or peel is not always saved or used, the device being designed to operate on a quantity or bulk of the fruit or vegetable desired and provision made for observation of the progress of the process.

With the foregoing and other objects in view, as will be apparent as the description proceeds, my invention resides in the combination and arrangement of parts and in the details of construction described in this specification and particularly pointed out in the appended claims, it being understood that changes in the particular embodiment of my invention may be made within the scope of what is claimed without departing from the spirit of the invention. I intend no limitations other than those of the claims when fairly interpreted in the light of the full disclosure and the present state of the art.

In the drawing:

Fig. 1 is a sectional elevation illustrative of a preferred form of power grater embodying my invention; Fig. 2 is a plan view of the casing and receptacle of Fig. 1 illustrating the supporting and spacing arrangement; Fig. 3 is a section of a modified cover for the casing of Fig. 1; Figs. 4 and 5 are illustrative of details of construction.

Similar reference characters refer to similar parts in all the views.

Turning to Fig. 1, a casing 2, preferably cylindrical and axially vertical, is supported as by a ring 19 secured to a table or bench 1. Within this casing 2 is a cylindrical member 3 open at both ends and, preferably, coaxial with the casing 2, fixedly supported thereby and spaced therefrom as by wing members 18 (Figs. 2 and 5) entering between grips 17, 17, in such fashion that the cylindrical member 3 may be disengaged and removed for cleaning by a straight axial pull. The side wall of the cylindrical member 3 is well perforated, as at 20 (Fig. 4) to form a vertical abrading surface not unlike a nutmeg grater. It is apparent that the abrading surface may be coarse or fine to the degree desired.

As a closure for the lower end of the cylindrical member 3, I preferably provide a rotatable disk 4, of somewhat smaller diameter than the inside diameter of the member 3 so as to provide a space therebetween all around the periphery of the disk 4. The disk 4 may be similarly perforated or otherwise provided with upwardly projecting portions, the center preferably, but not necessarily, provided with a crowned or bulged up part 16 which tends to throw the contents or load to the outside. The arrangement of the projections on the disk 4 (Fig. 2) may be in quadrants or otherwise, leaving smooth portions between for structural purposes, as the necessary drilling, punching or welding.

To give rotating or similar motion, the disk 4 is removably mounted on a shaft 5 and through gears 6 and shaft 7 may be driven by a pulley 8, a belt 9, and a motor 10 with suitable pulley, when power is desired. Pulley 8 may be turned manually, if desired.

Below the casing 2 and thus below both the cylindrical member 3 and the disk 4, is provided a receptacle for abraded material, in this case a drawer 12 in the table or bench 1.

By spacing the side wall of the cylindrical member 3 from the casing 2, a substantially annular passage 11 is provided external to the abrading surface of member 3 so that particles of abraded skin or peel passing through the perforations 20 may be discharged therefrom by gravity into the receptacle 12.

A cover or closure 13 is provided for the top of the casing 2, preferably with an opening 14 therein for ready inspection of the fruit or vegetables during the operation of the grater. If desired, in place of an open cover 13, a cover 13A (Fig. 3) may be used with a wire netting 15 across the top of such large mesh as not to greatly interfere with a view of the process.

In operation, using my preferred form of power grater herein described, a bulk or quantity of lemons, say, amounting to perhaps 3 or 4 dozen, are placed in the receptacle formed by the abrading side wall of the cylindrical member 3 and the rotating bottom disk 4, the disk revolved at perhaps 250–300 R. P. M. for 2 or 3 minutes, cover 13 being on and the progress of the action being clearly observable through opening 14. The disk 4 by reason of upwardly projecting portions, as the perforations 20, tumbles the contents against tthe fixed side wall of member 3, resulting in the skin or rind being grated or abraded off to the degree desired and falling into the receptacle 12, where it may easily be recovered and immediately used.

By similar action such vegetables as potatoes may be peeled rapidly by abrasion with little loss of material and without flushing. A variable speed motor may be used and spare cylindrical abrading members of various coarseness may be substituted interchangeably, giving wide flexibility of operation.

It is apparent that the parts of the grater may be of suitable non-corroding material, such as stainless steel, and the cylindrical member and disk may be readily removed from the top for cleaning, leaving free access to all the remainder of the device. It is further apparent that the dry operation of the device permits not only a self-contained and economical grater but also results in a superior abraded product as no essential oils are carried away.

What I claim is:

1. A dry grater for fruit and vegetables comprising a table structure having a top plate provided with a central opening therethrough, a cylindrical casing projecting downwardly through said opening and supported on said top plate by a ring member external to said casing, a cylindrical abrading member removably supported within said cylindrical casing of such diameter as to provide therewith an annular discharge passage for abraded material external of said abrading member, a drawer for reception of abraded material positioned below said cylindrical casing and horizontally removable from said table for unloading and cleaning, driving mechanism supported by said table structure free from engagement with either said cylindrical casing or said abrading member comprising a horizontal drive shaft above said drawer and driving means therefor to one side and out of the stream of discharged abraded material, a vertical shaft connected to said horizontal shaft and vertically projecting upward therefrom, a rotatable disk of less diameter than said abrading member removably mounted on the top end of said vertical shaft to be rotated thereby and positioned within and adjacent the lower end of said abrading member of such character as to form with said abrading member an obstruction free container for the reception of material to be abraded.

2. A dry grater for fruit and vegetables comprising a structure having a supporting frame, a cylindrical casing open at both ends and axially vertical, supported by said frame in an elevated position and projecting above said structure and downwardly within said frame, a cylindrical abrading member open at both ends, coaxial and within said casing, supported by said casing and vertically removable therefrom and of such character as to provide an annular discharge passage between said casing and said abrading member open at the lower end, a horizontally removable receptacle for abraded material supported by said frame and positioned below said casing and of such character as to receive any discharge from said annular passage, driving mechanism supported by said frame free from engagement with either said casing or said abrading member and including horizontal driving means and a vertical shaft driven thereby and projecting from below upward a short distance into the lower open end of said abrading member, a rotatable disk of less diameter than said abrading member mounted on the top end of said vertical shaft to be rotated thereby and forming the bottom closure for said abrading member of such character as to provide thereabove in conjunction with said abrading member a container for the reception of the material to be abraded free of obstruction or moving parts, said disk being upwardly removable from engagement with said vertical shaft.

MONROE BOSTON STRAUSE.